United States Patent [19]

Steigerwald et al.

[11] Patent Number: 4,864,479
[45] Date of Patent: Sep. 5, 1989

[54] FULL-BRIDGE LOSSLESS SWITCHING CONVERTER

[75] Inventors: Robert L. Steigerwald, Burnt Hills; Khai D. T. Ngo, Schenectady, both of N.Y.

[73] Assignee: General Electric Company, Schenectady, N.Y.

[21] Appl. No.: 187,611

[22] Filed: Apr. 28, 1988

Related U.S. Application Data

[63] Continuation-in-part of Ser. No. 164,603, Mar. 7, 1988.

[51] Int. Cl.[4] ........................................... H02M 3/335
[52] U.S. Cl. ........................................ 363/17; 363/56; 363/98; 363/132
[58] Field of Search .................. 363/17, 56, 98, 132

[56] References Cited

U.S. PATENT DOCUMENTS

| | | |
|---|---|---|
| 4,426,564 | 1/1984 | Steigerwald . |
| 4,460,949 | 7/1984 | Steigerwald ............ 363/28 |
| 4,477,868 | 10/1984 | Steigerwald ............ 363/28 |
| 4,504,895 | 3/1985 | Steigerwald ............ 363/17 |
| 4,533,986 | 8/1985 | Jones ...................... 363/17 |
| 4,541,041 | 9/1985 | Park et al. .............. 363/41 |
| 4,566,059 | 1/1986 | Gallios et al. ........... 363/17 |
| 4,586,118 | 4/1986 | Mihalka .................. 363/17 |
| 4,611,267 | 9/1986 | McMurray ............... 363/58 |
| 4,628,426 | 12/1986 | Steigerwald ............ 363/17 |
| 4,639,844 | 1/1987 | Gallios et al. ........... 363/17 |
| 4,672,528 | 6/1987 | Park et al. .............. 363/98 |
| 4,685,040 | 8/1987 | Steigerwald et al. ... 363/17 |
| 4,709,316 | 11/1987 | Ngo et al. ............... 363/21 |
| 4,723,188 | 2/1988 | McMurray . |

OTHER PUBLICATIONS

"A New Non-Dissapating Load Line Shaping Technique Eliminates Switching Strss in Bridge Converters", Goldfarb, Proceedings of Powercon 8, 1981, pp. D4; 1-6.
"Psuedo Resonant Full Bridge DC/DC Converter", O. D. Patterson et al., 18th Annual IEEE Power Electronics Spec. Conference, Jun. 21-26, 1987, pp. 424-430.
"Exploratory Development of Microelectronics Power Supply", GE Corp. Res. & Dev. Tech. Prop. CRD-5173.027C, Mar. 1987, pp. 2-10/2-14.
Patent Application Ser. No. 907,418—McMurray—"Protection of GTO Converters by Emitter Switching", filed 9-15-86.
Patent application Ser. No. 045,655, Steigerwald—"Control Circuit for Insuring Super Resonant Operation of Resonant Converter", filed 5-4-87.
"High Frequency Resonant Transistor DC-DC Converters", IEEE Trans. Ind. Electron, IE-31, pp. 181-191, May 1984.
"Analysis of a Resonant Transistor DC-DC Converter with Capacitive Output Filter", IEEE Trans. Ind. Electron. IE-32, pp. 439-444, Nov. 1985.
"A Complete dc Analysis of the Series Resonant Converter", IEEE Power Electronics Specialists Conf., 1982 Record, pp. 85-100.
"High-O Approximation in the Small-Signal Analysis of Resonance Converters", IEEE Power Electronics Specialists Conf., 1985, Record, pp. 707-715.

Primary Examiner—Patrick R. Salce
Assistant Examiner—Emanuel Todd Voeltz
Attorney, Agent, or Firm—Jill M. Breedlove; James C. Davis, Jr.; Marvin Snyder

[57] ABSTRACT

A full bridge integrable dc-to-dc converter is described which includes four FET switching devices wherein the parasitic capacitors of the switching devices exchange energy with the leakage and magnetizing inductances of the converter transformer. Since energy is exchanged between the passive components of the circuit, the switching is accomplished in a substantially lossless manner. Energy not transmitted to the load is returned to the source rather than being dissipated in the active devices of the converter. Further, single frequency operation is accomplished over a broad range of output conditions by phase shifting the converter legs relative to one another.

13 Claims, 8 Drawing Sheets

FULL-BRIDGE LOSSLESS SWITCHING CONVERTER

RELATED APPLICATIONS

This application a continuation-in-part of application Ser. No. 164,603, filed Mar. 7 1988.

U.S. application Ser. No. 164,603 is related to concurrently filed copending U.S. application Ser. No. 164,600, entitled "Gate Driver for a Full-Bridge Lossless Switching Device", assigned to the instant assignee, and is specifically incorporated by reference.

The present invention relates in general to dc-to-dc converters and more specifically to an integratable converter circuit having substantially zero losses in the switching transistors.

BACKGROUND OF THE INVENTION

Many types of dc-to-dc converters are known in the art for converting a first dc voltage to a second, regulated dc voltage. Typically, the dc input voltage is converted to an ac voltage (or dc pulses) by a switching transistor or transistors. The ac voltage is then converted to a regulated dc output voltage. Feedback of the output voltage may be used to control the duty cycle or the frequency of the ac voltage to achieve the desired voltage regulation.

Switching converters are known to have a higher efficiency than other types of dc power supplies, such as series-regulated power supplies. However, the efficiency of switching converters is limited by losses in the switching transistor(s) during turn-on and turn-off, particularly in pulse-width modulated (PWM) converters. In addition, the switching transistor(s) must simultaneously withstand high current and high voltage during both turn-on and turn-off.

Class E, Quasi-Resonant, and Bridge type resonant converters have all been used to achieve high frequency lossless switching. These circuits use high frequency inductors and capacitors to resonate the current or voltage across a device to zero in order to achieve low loss switching. These passive components cannot be integrated and therefore are not desirable for a very high density system.

Resonant converters use a variable frequency ac voltage for regulating the dc output voltage. Commonly assigned U.S. Pat. No. 4,672,528 of Park et al., which is incorporated herein by reference, describes such a resonant converter and provides a detailed background of the advantages and disadvantages of resonant converters. In resonant converters, it is possible to have either lossless turn-on or lossless turn-off, but not both. Furthermore, current in the transistor(s) of a resonant converter is relatively high. Because of these large currents, such resonant converters require costly transistors with high current ratings. Therefore, one of the primary goals of converter design is to reduce the transistor losses which degrade circuit efficiency and increase the cost of the converter.

Another goal of converter design is to reduce the size and weight. One proposed method of reducing the size and weight of the converter, while beneficially increasing the response time, is to increase the converter switching frequency. By increasing the switching frequency, a converter having smaller size, low weight, and faster response times can be obtained. The size and weight are decreased because the passive components required for operation at high frequency are smaller. However, the higher frequency switching aggravates transistor losses and degrades efficiency.

Normally, the switching devices utilized in switching power supplies are bipolar transistors, thyristors or field effect transistors. Although these devices may be modeled as ideal switches, it is well known that a more accurate model includes the parasitic effects of the device geometry These parasitic components include diodes, capacitors and inductors whose effect on circuit operation may be minimized or ignored by proper design of the switching devices. Conversely, again by proper device selection or design, certain parasitic effects may be enhanced and beneficially employed in the operation of the circuit. Physical transformers also include nonideal parasitic elements which may be beneficially employed by proper design of the transformer and the switching circuit.

In order to reduce the expense, size and weight of conventional switching converters, it would be advantageous to design a switching converter which could utilize the parasitic characteristics of the switching devices and the isolation transformer of the switching circuit. Utilizing the parasitic characteristics of the switching devices and the transformer, it is possible to eliminate many of the discrete components of a switching converter which contribute substantially to its size, weight and cost.

SUMMARY OF THE INVENTION

A full bridge is operated in such a manner that substantially lossless switching of the semiconductor switching devices results. The magnetizing and leakage inductances of the high frequency transformer exchange energy between the transformer and the switching device output capacitances such that energy stored in the device capacitances is returned to the dc source rather than dissipated in the device.

In one embodiment of the present invention, a voltage sensing circuit is included as part of the switching device gate driver. The voltage sensing circuit senses the precise instant to gate the power FET on in order to maintain lossless switching.

In a second embodiment of the present invention, a "dead time" resistance is included in the gate drive circuitry of the switching device to increase the rise time of the gating signal. The "dead time" resistance is selected to ensure that the switching device turns on only after the parasitic output capacitance of the switch has been substantially discharged.

It is an object of the present invention to achieve a high density power supply by selecting a topology with a minimum number of passive components which is integrable.

It is a further object of the present invention to achieve a circuit topology which uses a minimum number of passive components and which switches in a substantially lossless manner and thus capable of high frequency operation.

It is a further object of the present invention to achieve a high density power supply operating efficiently in the 1 to 10 MHz range.

BRIEF DESCRIPTION OF THE DRAWINGS

The novel features of the invention are set forth with particularity in the appended claims. The invention itself, however, both as to organization and method of operation, together with further objects and advantages thereof, may best be understood by reference to the following description taken in conjunction with the accompanying drawings in which:

DETAILED DESCRIPTION OF THE INVENTION

Figure 1:
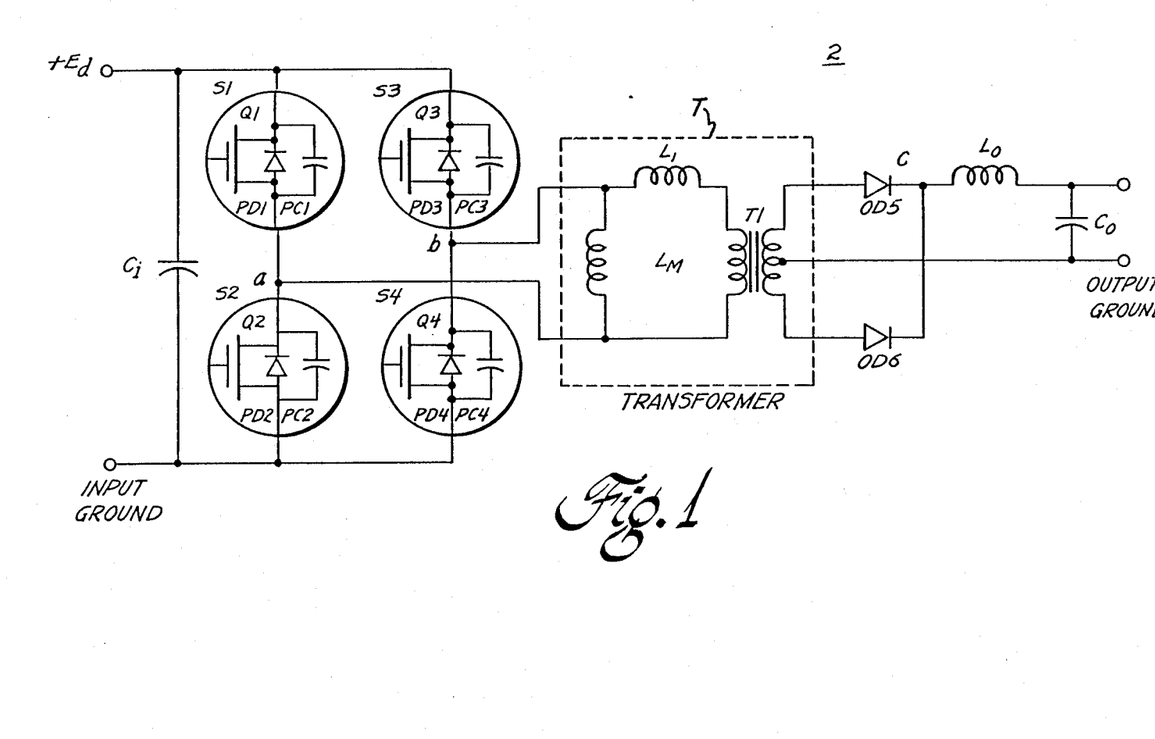
FIG. 1 is a schematic diagram of a power circuit for a lossless switching full-bridge converter according to the present invention.

FIG. 1 illustrates a lossless switching full-bridge converter 2 in which the input is driven by dc source voltage $E_d$. Input capacitor $C_i$ smooths input voltage $E_d$ and stores energy returned to the source from the components of the full bridge. In FIG. 1, high voltage switching devices S1, S2, S3 and S4 (FET transistors) form a bridge at the converter input. The series combination of switching devices S1 and S2 is connected in parallel across capacitor $C_i$ and the series combination of switching devices S3 and S4.

In FIG. 1, parasitic capacitance PC1 and parasitic diode PD1 are connected across the drain and source leads of ideal FET switch Q1. Q1 is an ideal FET while PD1 is its inverse parallel parasitic diode and PC1 is its parasitic output capacitance (the sum of the drain-gate and drain-source capacitances). Parasitic capacitors PC2–PC4 and parasitic diodes PD2–PD4 are likewise connected across the source and drain electrodes of ideal FET switches Q2–Q4. These parasitic capacitors and diodes represent actual parasitic devices which result from the geometry of the switching device.

The node connection between switching devices S1 and S2 is labeled a and is connected to one end of the primary of transformer T. The other end of the transformer primary is labeled b and is located at the node between switching devices S3 and S4.

Transformer T consists of ideal transformer T1, leakage inductance $L_l$ and magnetizing inductance $L_M$. The output of transformer T is connected through a rectifying bridge consisting of diodes OD5 and OD6 to a low pass filter consisting of inductor $L_o$ and capacitor $C_o$. The output voltage is labeled $E_o$ (typically 5 volts).

The topology illustrated in FIG. 1 uses a minimum number of passive components. Only an input high-frequency bypass capacitor $C_i$, an isolation transformer T, and an output filter $L_o$, $C_o$ are necessary. In addition, the four switching devices S1–S4 in FIG. 1 have ratings (especially voltage ratings) considerably below the ratings required of transistors employed in other high-frequency switching converters. Therefore, the circuit of FIG. 1 is more amenable to integration which is desirable in order to achieve high power density. In addition, the topology of FIG. 1 results in very low switching losses. Finally, the output voltage may be controlled by phase-shifting of the two half-bridge legs (i.e., the voltage at nodes a and b) to control the output voltage $E_o$.

Figure 2:
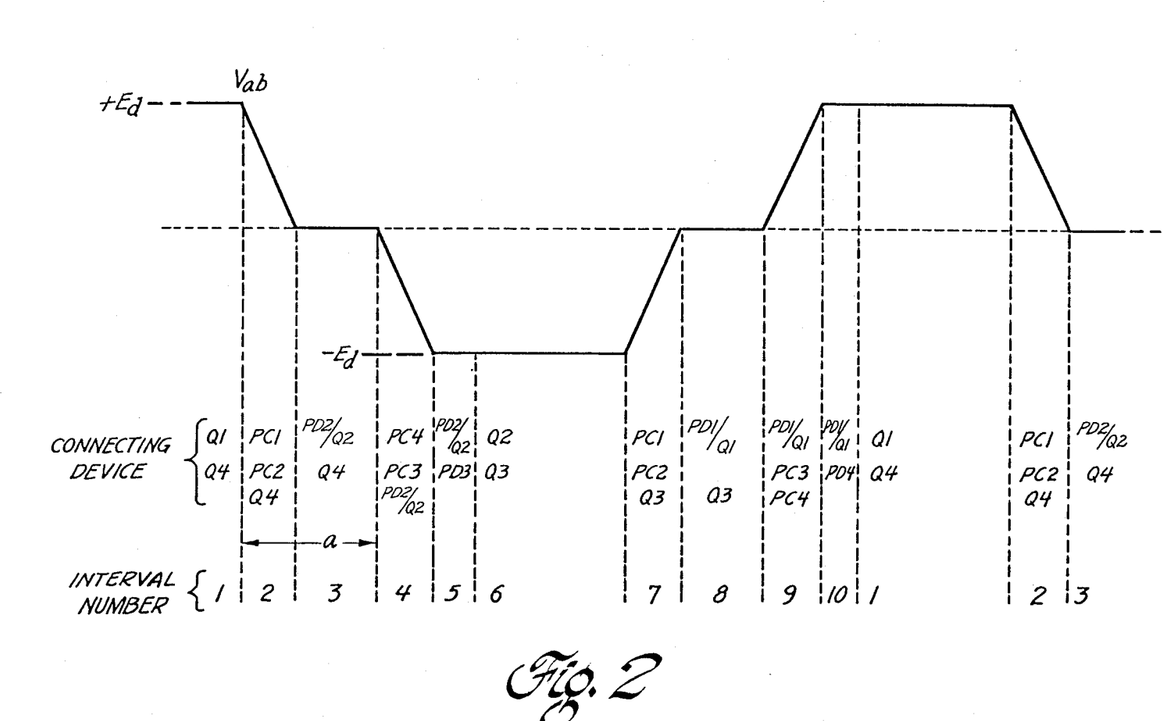
FIG. 2 illustrates the transformer drive voltage of the circuit illustrated in FIG. 1.

FIG. 2 illustrates the voltage waveform applied to high-frequency transformer T (i.e., the voltage between points a and b) during normal operation. Below the waveform in FIG. 2 is listed the conducting devices during each interval of operation over a complete cycle. For example, switches Q1 and Q4 both conduct during interval 1. Interval 1 ends when switch Q1 stops conducting. During interval 2, capacitors PC1, PC2 and switching device Q4 conduct. The actual operation of the circuit of FIG. 1 may now be described in greater detail with reference to the waveform of FIG. 2.

Referring to the waveform of FIG. 2, operation of the circuit in FIG. 1 is as follows. The description of operation begins in interval 1 when switches Q1 and Q4 are gated on and are conducting, thus supplying the full dc input voltage, $E_d$, to the transformer (the voltage drops of the power FETs and diodes will be neglected to simplify this discussion). Thus, during interval 1, point a is at $E_d$ and point b is at zero volts. The voltage at point c (and thus the output voltage $E_o$) is a function of the transformer turns ratio. Note that, during interval 1, the output capacitances of both switches Q2 and Q3 are charged to the full dc value $E_d$. Also during interval 1, current is built up linearly in the transformer magnetizing $L_M$ and leakage $L_l$ inductances. This energy will serve a purpose which will be evident shortly.

At the end of interval 1, switch Q1 rapidly turns off (switch Q4 continues to conduct), and the current that was in switch Q1 is maintained by the transformer $L_M$ and $L_l$ inductances. Thus, current is maintained in transformer T after switch Q1 is turned off at the end of interval 1. During interval 2, the inductive current which is now in capacitors PC1 and PC2 drives node a toward ground. Note that the energy that was initially in capacitor PC2 is not lost, but rather discharged to the dc supply When node a reaches ground, the inverse parallel diode PD2 of switch Q2 comes into conduction (assuming an ideal diode characteristic) which marks the beginning of interval 3. Once diode PD2 is conducting, FET switch Q2 will be gated on when the voltage across switch Q2 is approximately zero.

During interval 3, the voltage between points a and b is zero as current, which is maintained by inductances $L_M$ and $L_l$, circulates through FET switch Q4 and diode PD2. The voltage at point c on the secondary side of the transformer is also near zero; however, output inductor $L_o$ maintains current at the output such that the voltage across the output load remains substantially constant. Interval 3 continues until FET switch Q4 turns off.

Note that the interval 2 plus interval 3 time, alpha, is controllable and may be used to regulate the output voltage. Control of this interval is accomplished by means of switching device Q4 which may be turned off at anytime during interval 2 or 3. When switch Q4 is turned off, capacitors PC3 and PC4 and diode PD2 conduct. The RMS voltage of the transformer drive is increased as the duration of intervals 4 to 7 increases in FIG. 2 (i.e., $\alpha$ becomes smaller).

At the end of interval 3, FET switch Q4 turns off; however, its current is maintained by inductances $L_M$ and $L_1$. At the same instant, capacitor PC4 begins to conduct the current which would have flowed through transistor Q4. Thus, during interval 4, the current flowing into point b, drives the voltage at point b toward the dc bus voltage, $E_d$. As the charge builds up on capacitor PC4, the voltage at node b increases, decreasing the voltage across capacitor PC3. Once capacitor PC3 is sufficiently discharged by the current flowing into node b, diode PD3 turns on. The energy stored in capacitor PC3 is not lost during this process; instead, it is discharged back to the dc supply. Once diode PD3 is conducting, FET switch Q3 will be gated on when the voltage across switch Q3 is approximately zero.

During interval 5, the current in the leakage inductance reverses rapidly as diode PD3 begins to conduct since the full dc voltage is applied to the leakage inductance $L_1$. The current in the larger magnetizing inductance $L_M$ also begins to reverse (the current in the magnetizing inductance is approximately a triangular wave over a complete cycle). Sometime during interval 5 (before the current in diodes PD2 and PD3 reach zero), FET switch Q3 turns on (switch Q2 is already conducting).

Once FET switches Q2 and Q3 turn on and the current has reversed in inductors $L_1$ and $L_M$, the transformer voltage is reversed. Therefore, the current in inductors $L_1$ and $L_M$ flows from node b, through the transformer primary and into node a during interval 6. Interval 6 is maintained at least long enough to ensure that the current in inductors $L_1$ and $L_M$ is sufficient to insure conduction during intervals 7–10.

During intervals 5 and 6 the full dc input voltage, $E_d$, is once again applied to transformer T. However, since the input voltage is applied to node b, the transformer voltage is reversed as compared to interval 1. The half cycle defined by intervals 6–10 repeats the sequence described above with switching devices Q2 and Q3 as the active switching elements. At the end of interval 10, the next cycle begins with interval 1. Again, output voltage $E_o$ may be regulated by adjusting the time alpha, which amounts to phase shifting the two half-bridge converter legs relative to one another.

One of the significant aspects of designing the circuit of FIG. 1 is the necessity of selecting a transformer with the proper characteristics. The optimum selection of inductances $L_M$ and $L_1$ depends on the application. Some magnetizing inductance $L_M$ is necessary to provide current to charge and discharge capacitors PC1–PC4 during no load (i.e., where the current in inductance $L_1$ is zero due to a no load condition at the converter output). However, there is an incentive to keep the peak current in inductance $L_M$ as low as possible, since the current rating of the FET's used for switching devices S1–S4 must be sufficient to carry the full load primary current and the current in inductance $L_M$. In addition, increasing inductance $L_M$ increases the time required to reverse the transformer current (e.g., during interval 5 of FIG. 2) which lowers the operating frequency of the converter. At full load, the current in inductance $L_M$ may be very small since leakage inductance $L_1$ can provide inductive energy for charging and discharging the device capacitances.

To meet these conflicting requirements, inductance $L_1$ could be minimized, and inductance $L_M$ could be designed to provide the inductive energy needed to achieve the charging and discharging of the device capacitances during both full and no load conditions. In this case, however, the peak current in inductance $L_M$ would have to be greater than the full load current (reflected to the primary side) in order to overcome the tendency of the current in inductance $L_M$ circulate through the primary of ideal transformer T1 when the transformer secondary is effectively shorted (e.g., during interval 3).

A finite inductance $L_M$ may be obtained by using a Nickel-Zinc Ferrite material for the transformer core. Nickel-Zinc has a relatively low permeability which results in a non-negligible magnetizing inductance, $L_M$. In addition, Nickel-Zinc is suited to operation above 1 MHz where the conventional power Ferrites (Manganese-Zinc) have excessive core losses. Nickel-Zinc thus provides a high frequency transformer core with a predictable, non-negligible magnetizing inductance. This material may, therefore, be used advantageously to construct transformer T.

Leakage inductance $L_1$ is inevitable in transformer design. However, leakage inductance is primarily a function of the transformer structure and the coupling between the transformer primary and secondary. Therefore, it is to a great extent controllable. By properly designing transformer T of FIG. 1, it is possible to obtain a leakage inductance which will work with the magnetizing inductance. In summary, transformer T of FIG. 1 is practical and realizable.

Because control of the converter is by relative phase shift of the two converter half-bridge legs, instantaneous switching of the converter legs in response to a sensed parameter is not required. That is, since the output voltage is a function of the relative phase shift between the two inverter legs, the absolute values of delays in logic circuitry from a master oscillator to the gate drivers is not critical it is the relative timing of the gate drive signals which is of importance, since it is the relative timing which determines the phase relationship between the currents in the half bridge legs. Phase shifting the converter half-bridge legs relative to one another even provides a means of reducing the output voltage to zero. Further, since it is possible to shift the phases almost instantaneously, this capability provides protection from output shorts. Absolute zero output voltage is attained by switching such that the voltage on the two converter legs are exactly in phase (i.e., the voltage at points a and b in FIG. 1 would rise and fall together) thus providing an effective current limit. The rate of output current rise when a short is encountered is limited by the output filter inductor, $L_o$.

In order to maintain lossless switching action, precise timing of the turn-on gating signal is needed. For example, referring to FIG. 2, at the end of interval 4 diodes PD2 and PD3 are both conducting. FET Q2 can be gated on during interval 3 or 4. During interval 5, switching device Q3, which is in inverse parallel with diodes PD3, is gated on so that, as the load current reverses, switching devices Q2 (which was gated during interval 3 or 4) and Q3 are ready to carry the current. Note, however, that switch Q3 cannot be gated on too early (for example during interval 4) because this would result in the FET output capacitances being discharged through the switching devices with a resulting loss of energy. Thus, switching device Q3 must be gated on at precisely the right moment during interval 5. Note that the time when interval 5 begins is not predictable since the length of interval 4 is a function of the current.

Figure 3A:
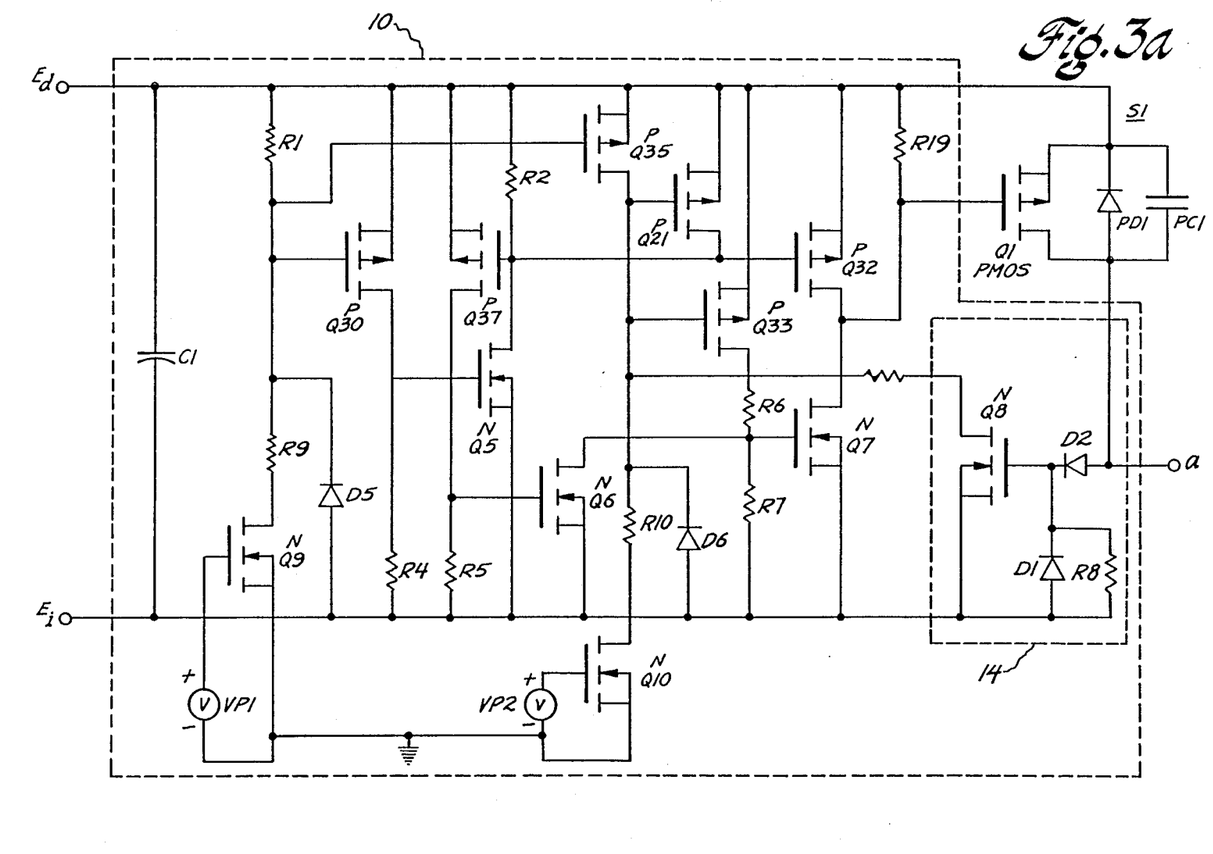
FIGS. 3a and 3b are schematic diagrams of one embodiment of the gate drive circuits for two of the switching devices illustrated in FIG. 1.
Figure 3B:
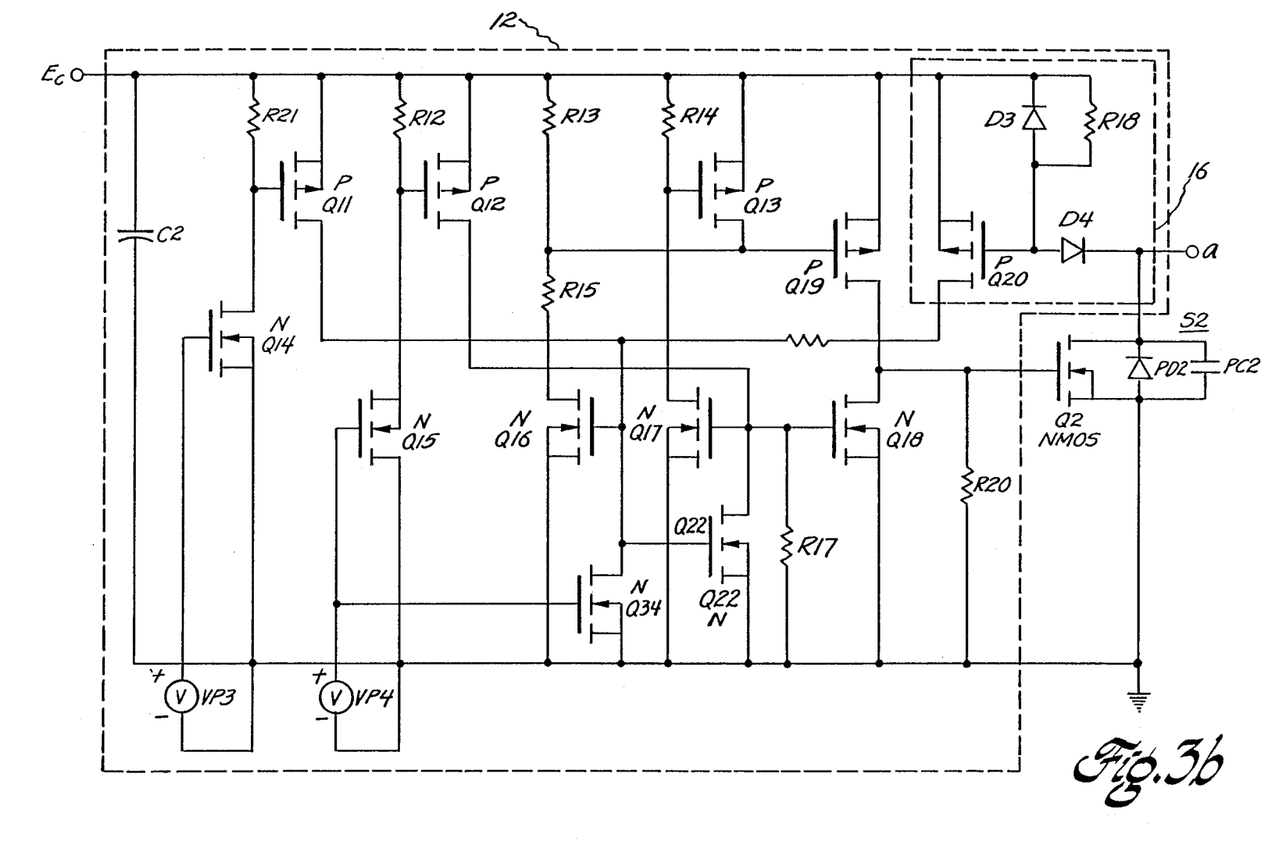

FIG. 3 illustrates one embodiment of two of the four gate drivers necessary to drive switching devices Q1–Q4 of FIG. 1. Upper gate driver 10 and lower gate driver 12 drive switching devices Q1 and Q2 respectively. Substantially identical gate drivers could be used to drive switching devices Q3 and Q4. All of the transistors illustrated in FIG. 3 are enhancement mode, insulated gate field effect transistors.

In FIG. 3, upper gate driver 10 is adapted to control transistor Q1 during both start-up and steady state operation. During start-up, the current in inductors $L_1$ and $L_M$ have not yet been established. Therefore, the voltage at node a remains constant until either transistor Q1 or Q2 is activated. Therefore, voltage VP2 is provided to initiate interval 1. VP2 is normally off; when it turns on, transistor Q10 turns on which activates transistor Q33 and turns on transistors Q1 through Q7. Transistor Q10 also activates transistor Q21 which raises the voltage at the gate of transistor Q32, which removes the turn-off gate drive of transistor Q1.

At the end of interval 1,, transistor Q1 may be turned off by means of a voltage VP1. When voltage VP1 is activated, transistor Q9 turns on which turns on transistors Q37 and Q32 through Q30 and Q5. Transistor Q32 shorts the gate of transistor Q1 to the dc bus carrying voltage $E_d$, turning off transistor Q1 while transistor Q37 ensures that transistor Q7 remains off by turning on transistor Q6 which removes the turn on drive provided by transistor Q7. Finally, transistor Q9 also turns on transistor Q35 which prevents transistor Q21 from turning transistor Q32 off, ensuring that transistor Q1 will be turned off. As will be apparent to those skilled in the art, gate driver 12 acts in a substantially identical manner to control the operation of transistor Q2.

As was previously mentioned, it is extremely difficult to predict the exact time at which transistors Q1–Q4 should be turned on to avoid losses resulting from the premature discharge of capacitors PC1–PC4. Therefore, gate drivers 10 and 12 include voltage sensors 14 and 16 which are designed to turn transistors Q1 and Q2 on at precisely the instant necessary to ensure substantially lossless switching.

Gate drive circuits 10 and 12 sense when the voltage across the respective switching devices Q1 and Q2 approach zero and gate the switching device on when this happens so that it is ready to carry the primary current as it reverses. In FIG. 3, switching device Q1 is a p-channel power device while switching device Q2 is an n-channel power device. This configuration is used in the embodiment of FIG. 3 because it facilitates integration of the gate drivers and switching devices on a single chip, while minimizing the capacitive substrate currents which result from the high rates of change of voltage at point a.

The keys to improved gate drivers 10 and 12 are voltage sensors 14 and 16, respectively, which are shown inside the heavy dotted lines in FIG. 3. Voltage sensor 14 senses the voltage across switching device Q1. (Voltage sensor 16 senses the voltage across switching device Q2.) During operation of the switching converter, the voltage of node a is a function of the magnetizing and leakage inductance currents as explained previously. Consider voltage sensor 14; when switching device Q2 turns off, the voltage at node a rises due to the inductive load charging capacitor PC2 and discharging capacitor PC1 as discussed above. When the voltage at node a exceeds the voltage $E_i$ at the negative terminal of gate driver 10, the sense FET Q8 turns on through diode D2, which turns on transistor Q1 through Q33 and Q7. Thus transistor Q1 is ready to conduct when the load current reverses.

In this manner the power FETs are gated on only when there is near zero voltage across them, thus insuring that the energy stored in the FET output capacitances is not "dumped" (and therefore lost) in the FET channels. Note that no control is needed to turn the FETs on; this is automatically done by the sense circuit (a similar circuit 16 is shown for transistor Q2). The control need only command a device to turn off. Thus, proper timing is assured to maintain lossless switching.

A signal to command the FETs to turn on is given by the control logic at a time known to be later than needed for proper circuit operation (that is, the FET voltage sensing devices will normally turn the power FETs on). These control turn-on commands are intended to get the circuit started because load current will not be available at start-up to insure that the load voltage node, $V_{LOAD}$, swings between the dc voltage rails. In addition, these logic circuits ensure proper operation of the circuit where the inductive currents are not sufficient to ensure proper operation of sense circuits 14 and 16. Diodes D2 and D1 protect the gate of transistor Q8 from excessive reverse voltage when transistor Q2 is conducting.

Figure 4A:
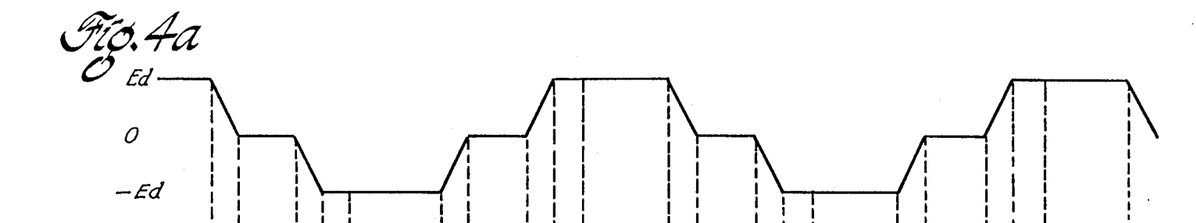
FIG. 4a illustrates the transformer drive voltage of the circuit of FIG. 1.
Figure 4B:
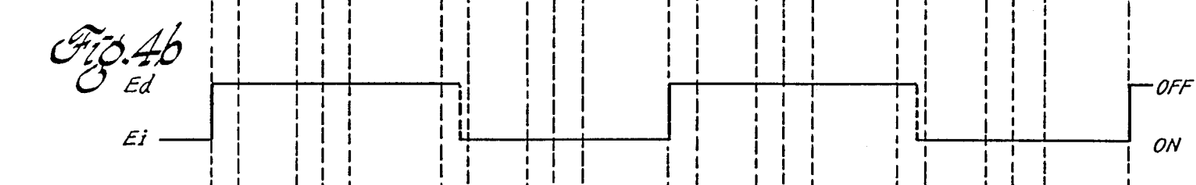
FIG. 4b illustrates the gate drive voltage as a function of time for one of the switching devices in FIG. 1.
Figure 4C:
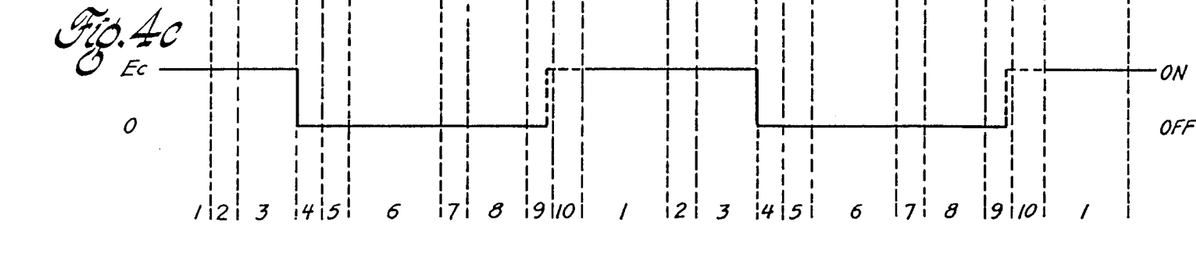
FIG. 4c illustrates the gate drive voltage as a function of time for a second of the switching devices illustrated in FIG. 1.

FIG. 4 illustrates the waveforms associated with the gate drivers of FIG. 3, including voltage sense circuits 14 and 16. FIG. 4(a) illustrates the output voltage between points a and b of FIG. 1. FIG. 4(b) illustrates the drive voltage at the gate of transistor Q1. FIG. 4(c) illustrates the drive voltage at the gate of transistor Q4.

Since Q1 is a P-channel metal oxide semiconductor PMOS transistor (see FIG. 3), it turns on as its gate drive voltage approaches $E_i$ and turns off as its gate drive voltage approaches $E_d$. $E_i$ is an intermediate voltage which is normally 15 volts below $E_d$ in the embodiment of FIG. 3. Therefore, at the end of interval 1, as the gate drive to transistor Q1 is increased from approximately $E_i$ to $E_d$, transistor Q1 turns off. Transistor Q1 turns on again as the voltage at node a approaches $E_d$ at the end of interval 7. This period is indicated in dashed lines in FIG. 4(b) since the actual point at which transistor Q1 turns on is a function of the time at which node a reaches a voltage, relative to ground, which exceeds $E_i$ by at least a diode drop, thus activating voltage sensor 14. Note that simply applying drive voltage to the gate will not cause the device to conduct since current may be flowing in the parasitic devices at the time the gate drive is activated. For example, transistor Q1 is turned on in FIG. 4(a) towards the end of interval 7 but, capacitor PC1 carries the current in switch S1 during interval 7 and diode PD1 carries the current through switch S1 during intervals 8–10.

In FIG. 4(c) the drive voltage to the gate of transistor Q4 is illustrated. As previously mentioned, the gate driver circuit for transistor Q4 would be substantially identical to gate driver 12 of FIG. 3, including voltage sensor 16. $E_c$ may be approximately 15 volts in the embodiment of FIG. 3. As the voltage at node b drops to approximately one diode drop below $E_c$, a voltage sensor, similar to voltage sensor 16, turns on transistor Q4. Since the voltage at point b reaches the required potential some time during interval 9, transistor Q4 turns on during that interval. As will be readily apparent, a substantially identical analysis will apply to the operation of switching devices Q3 and Q2.

Figure 5:
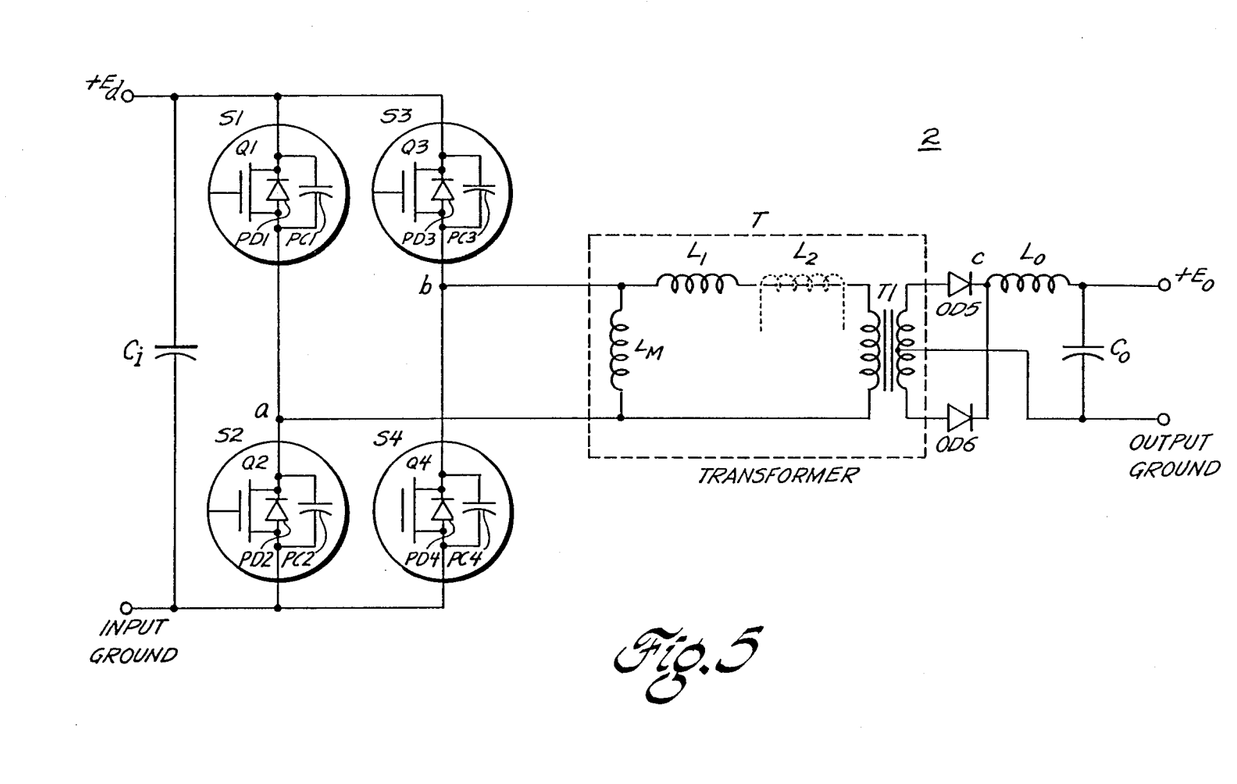
FIG. 5 is a schematic diagram of the power circuit of FIG. 1 wherein the transformer includes the reflected output filter impedance.
Figure 7:
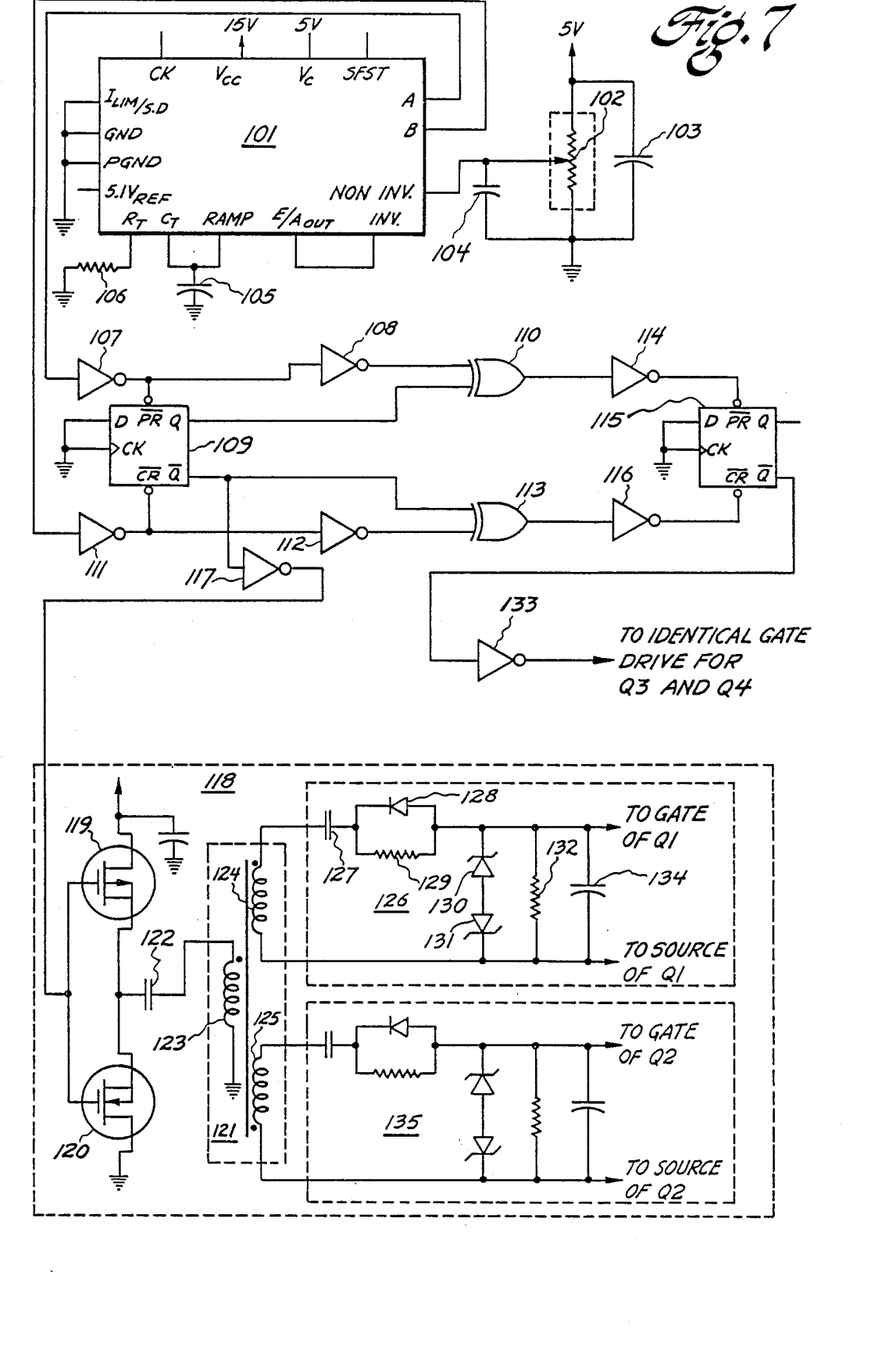
FIG. 7 is a schematic diagram of the control/drive circuitry for one embodiment of the present invention including a "dead time" resistance.

A further embodiment of our invention, illustrated in FIGS. 5 and 7, does not use voltage sensor circuits 14 and 16. The embodiment of FIGS. 5 and 7 can be employed where exact control of the turn on time is not essential. For example, it may be advantageous to use the present invention in circuits where the primary considerations are cost and size. In such a circuit it is recognized that some switching losses may be tolerated to achieve the cost and size constraints.

In circuits where cost and size are primary considerations, the voltage sensors 14 and 16 might be eliminated to reduce both. The voltage sensor would be replaced by a means for limiting the turn on rise time of the switch. For example, if switch S1 were a field effect transistor, its turn on rise time might be limited by inserting a resistor in series with the gate. Such a resistor forms an R-C circuit with the input capacitance of the gate, limiting the rise time of the gate voltage and, thus, the turn on time of the switch.

Limiting the turn on time of the switch has two distinct advantages. First, it prevents shoot through fault; and, second, the rise time may be adjusted, according to the present invention, to allow sufficient time for the parasitic output capacitance of the switch to discharge through the transformer parasitic inductance.

Shoot through is the term applied to the undesirable consequences of turning on both switches of one leg at the same time. For example, if switches S1 and S2 were to turn on at the same time, the power supply would be shorted to ground and the resulting current surge would probably destroy the switches. Shoot through may be prevented by ensuring that both transistors of a leg are never on at the same time. In the conventional PWM converter, the problem of shoot through fault becomes especially serious where the gate drive signals to a particular leg approach a duty cycle of 50%. Therefore, in converters where the gate drive operates on a duty cycle of 50%, the problem of shoot through fault has conventionally been solved by delaying the turn on instant of one switch to ensure that the other switch of the pair is off. For example, switch S3 is never turned on while switch S2 is on. In such converters we may define the switch being turned off as the outgoing switch and the switch being turned on as the incoming switch.

While the instant at which a switch is turned on has conventionally been delayed (from the turn off instant of the outgoing switch) long enough to prevent shoot through faults, it has not been recognized that the efficiency of the converter could be increased substantially by delaying the turn on instant (i.e., the time at which the drain-source voltage drops to substantially zero). If the turn on instant is delayed sufficiently such that the parasitic output capacitor of the switch is fully discharged through the parasitic inductance of the transformer, the switching converter will operate in a substantially lossless manner.

The period between the turn off of one switch and the turn on of the other switch in the same leg may be referred to as the "dead time". As was previously noted, some dead time is necessary to prevent shoot through faults. However, the dead time which concerns us here is the additional dead time necessary to ensure that the parasitic output capacitance is discharged through the inductances associated with the transformer (see FIG. 5).

The rise time of the gate voltage being turned on, and thus the dead time, may be controlled by any number of techniques. The simplest and cheapest of these techniques involves inserting a dead time resistance in series with the gate of the switch to create an R-C time constant.

Since the use of "dead time" resistance to decrease the rise time of the switching device achieves the objectives of the present invention in a manner which differs from the sense circuits of the previously described embodiment, it is useful to analyze the operation of the embodiment in FIGS. 5 and 7 in a manner which differs from the analysis used for the embodiment of FIGS. 1 and 3. Although the analysis differs, it will be understood that the operation and structure of the basic converter are substantially identical in both embodiments.

Of course, using a resistor to generate an R-C time constant results in a fixed dead time. Such a fixed dead time is acceptable in those instances where the load is relatively constant. Where there is a constant load, the fixed dead time will not be a problem since the parasitic capacitance will discharge at a fixed, determinable rate. A fixed dead time would also be acceptable in those situations where it is not of great importance whether the efficiency decreases with decreasing load. This is generally true since, in most systems, the loss specifications are developed for operation under nominal (i.e. full load) conditions. While it is recognized that the switching loss (i.e., the loss resulting from discharging the parasitic capacitor through the switch) would increase as the load is decreased (for a fixed dead time), this increased loss is small compared to the other system losses at light load. However, should such losses be deemed unacceptable, the magnetizing inductance can be designed to sustain the light load switching current which will decrease the light load switching losses by discharging the parasitic capacitor within the dead time. Before discussing the magnetizing inductance further, it would be useful to discuss the relationships between output current and load.

The discharge time of the parasitic output capacitance PC1-PC4 is related to the output load by the primary current. The greater the load current, the greater the current in leakage inductance of the transformer (i.e., primary current). When the current in the parasitic inductance is large, the parasitic capacitance is discharged faster.

The dc-dc converter shown in FIG. 5 is a full-bridge converter which applies voltage pulses to the output filters. The width of these pulses is controlled to obtain the proper output voltages for an input voltage range of 180–360V.

Figure 6:
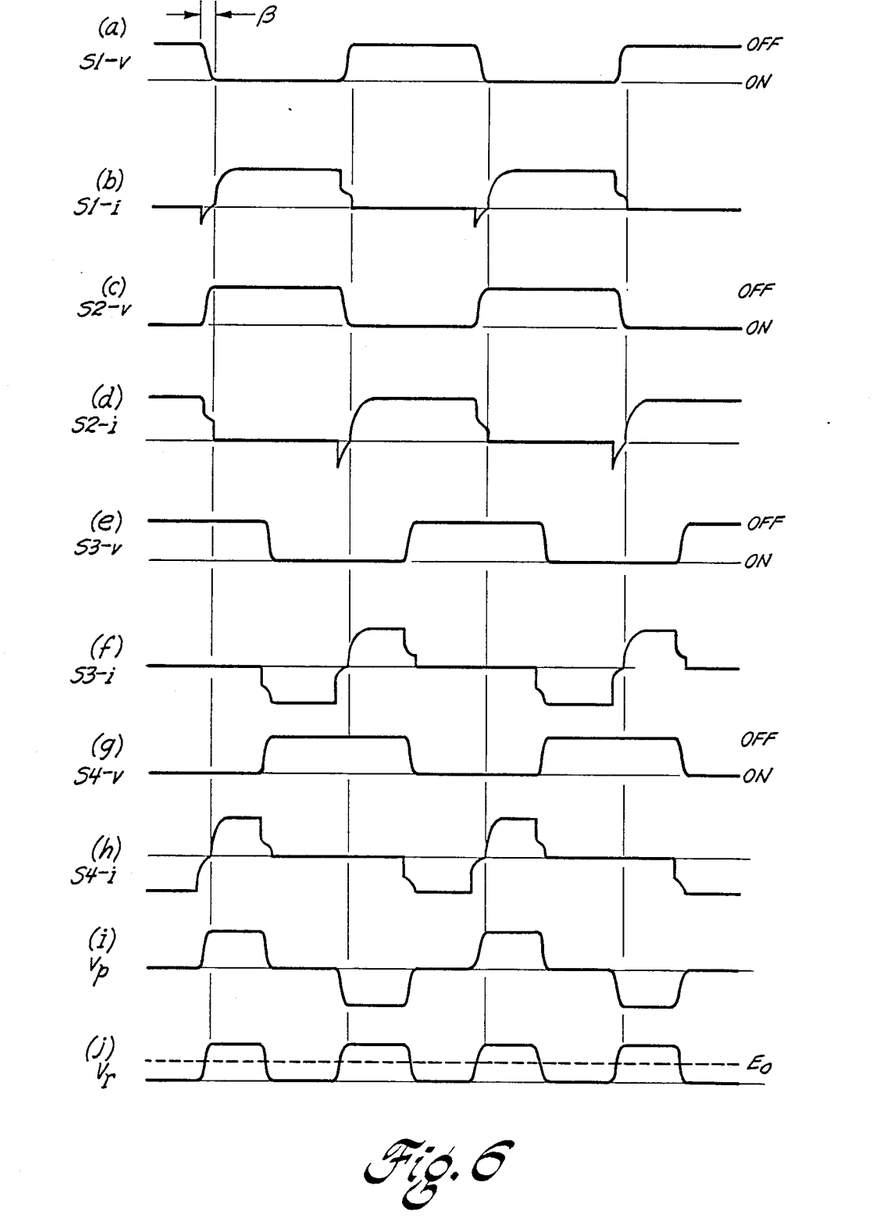
FIG. 6 illustrates the drain-to-source current and voltage waveforms for each of the switching devices S1–S4.

Referring now to FIG. 6, in one embodiment of a pulse width modulated switching converter according to the present invention, the gate drive to each MOSFET is a square wave with an operating frequency of 500 kHz and a duty cycle of approximately 50%. The devices on each leg of the bridge are gated alternately. To increase converter efficiency and to avoid shoot-through fault, a predetermined delay in the turn-on time of each of the switches is achieved by slowing the gate voltage rise, thus allowing one device to turn off before the next is gated on.

The 50% duty cycle of the gate drive waveform in conjunction with the predetermined "dead time" results in very low turn-on losses. FIG. 6 illustrates the voltage and current waveforms associated with switches S1–S4 in the embodiment presently under discussion.

FIG. 6(a) illustrates the voltage across switch S1. FIG. 6(b) illustrates the current through switch S1.

FIG. 6(c) illustrates the voltage across the switch of S2. FIG. 6(d) illustrates current through switch S2. FIG. 6(e) illustrates the voltage across switch S3. FIG. 6(f) illustrates the current through switch S3. FIG. 6(g) illustrates the voltage across switch S4. FIG. 6(h) illustrates the current through switch S4. FIG. 6(i) illustrates the primary voltage. And, FIG. 6(j) illustrates the rectified transformer output voltage.

The dead-time necessary may be different for each leg of the converter due to the inductance reflected through the transformer from the output filter. If a switch is turned off at the end of an interval in which the voltage across the transformer is zero, the output filter inductance is not reflected. If, however, the switch is turned off at the end of an interval during which the voltage across the transformer is non-zero, the output filter inductance will be reflected. The output filter inductance reflected to the primary is illustrated in FIG. 5 as $L_2$. From FIG. 6 it can be seen that the voltage across the transformer primary is zero just before transistors Q1 or Q2 turn off. Therefore, the output filter inductance is not reflected to the primary during the discharge of either capacitor PC1 or PC2. However, just before both transistors Q3 or Q4 turn off, the voltage across the primary is non-zero. Therefore, capacitors PC3 and PC4 discharge into an inductance which includes the reflected output filter inductance $L_2$.

More specifically, when transistors Q1 and Q4 are conducting current, the output filter inductances are reflected to the primary by the turns ratio squared. When transistor Q4 turns off, the primary current splits between capacitances PC3 and PC4, discharging capacitance PC3 and charging capacitance PC4. Once capacitance PC3 is substantially discharged, the current flows through diode Pn3. The exact rise time necessary to ensure lossless switching of transistors Q3 and Q4 depends on the resonance between inductance $L_2$ and capacitances PC3 and PC4, as well as on the initial current in inductance $L_2$ (just before transistor Q4 is turned off) and the supply voltage $V_{in}$. This action occurs quickly (except at light load) because the primary current is large and does not decrease rapidly due to the magnitude of inductance $L_2$. Since transistor Q3 is turned on into effectively zero drain-to-source voltage $V_{ds}$, turn-on loss is substantially eliminated.

The ideal switching devices Q1 and Q2 in the left leg of the bridge will also have low turn-on loss if the turn on rise time of transistors Q1 and Q2 is selected correctly. For example, when transistors Q1 and Q3 are conducting current, the voltage between points a and b is zero (excluding the on voltage drop over transistor Q1 and the diode drop of Q3). The output filter inductance is no longer reflected to the primary and the most prominent inductance is the leakage inductance, $L_1$, of the transformer. As transistor Q1 turns off, the primary current splits between capacitances PC1 and PC2, discharging PC2 and charging PC1.

The difference in the left- and right-leg mechanisms is the magnitude of inductance $L_1$ versus inductance $L_2$. In the right-leg mechanisms, the reflected inductance is large enough to keep the primary current essentially constant during switching, and point b is charged to the other voltage rail almost immediately. As the voltage over inductance $L_1$ changes with the discharging and charging of capacitances PC1 and PC2, respectively, this small leakage inductance allows the primary current to change ($V/L_1 = di/dt$). With the decreasing current, the discharging and charging of the parasitic capacitances occurs slower than those in the right leg. The timing in the switching transient of the left phase leg Q2 depends on the resonance between inductance $L_1$, capacitances PC1 and PC2, and also on the initial current in inductance $L_1$ (i.e., just before transistor Q1 is turned off) and voltage $V_{in}$. Therefore, the low turn on loss in the left leg is achieved by further delaying the turn-on time for switch Q1 or Q2 so that the output capacitance has sufficient time to discharge before Q2 or Q1 is turned on.

In a further embodiment of the present invention, the efficiency of the switching converter may be improved by decreasing the magnetizing inductance, such as, for example, by using a gapped transformer. The magnetizing inductance $L_M$ of the transformer is important for low-loss switching during light-load operation (see previous discussion of switching loss at light load). In this situation the reflected load current in the primary winding is very small, and may even be discontinuous. At light loads, the major inductive effect comes from $L_M$, (which may be decreased by gapping the transformer), and $L_M$ performs the same function as $L_2$ in enhancing low-loss turn-on in the switching of the right leg of the bridge. In conventional PWM converters which do not employ the present invention, it was thought to be advantageous to make the magnetizing inductance very large. However, in the present invention, a very large magnetizing inductance would be a disadvantage since the current in the magnetizing inductance would not reach the value necessary to discharge the parasitic capacitor completely during the dead time. On the other hand, the magnetizing inductance must not be made too small because it would unacceptably increase the current carried by the switches. To achieve these conflicting goals, the transformer may be designed with a gap which is adjustable to provide the desired magnetizing inductance.

Turn-off losses are reduced by the output capacitances PC1 through PC4 which act as lossless snubbers. During turn-off the capacitance slows down the $V_{ds}$ voltage rise over the outgoing switch while the current through the device is declining. Without these capacitances, voltage $V_{ds}$ would rise to the rail voltage at a much faster rate and there would be much larger switching loss.

Referring again to FIG. 5, the output voltage, $E_o$ of the supply is tightly controlled using a phase-shifted PWM technique. The $V_{ds}$ voltage waveforms of the switches in FIG. 6 result in the primary voltage $V_p$ and rectified secondary voltage $V_r$ shown in waveforms 6(i) and 6(j), respectively. $E_o$ is the average value of the rectified voltage. It will be recognized that, in order to display transients, dead time delay $\beta$ has been exaggerated in FIG. 6 (see especially 6a). Because the dead time delay is exaggerated, this set of waveforms shows about a 35% duty ratio in the rectified transformer voltage, when normally a phase lag of 90° in voltage $v_{ds}$ of transistors Q3 and Q4 with respect to transistors Q1 and Q2 (as shown in FIG. 6) results in a 50% duty ratio. When the gate signals for transistors Q3 and Q4 are delayed by 135° with respect to the gate signals for transistors Q1 and Q2, the rectified voltage has a duty ratio of 75% and $E_o$ will be 75% of the maximum value.

The maximum value of the rectified voltage $E_o$ changes proportionally with the dc input voltage as a function of the turns ratio of transformer T. As the input voltage increases, the duty ratio has to decrease in order to keep a constant output voltage. The circuit equation relating $E_o$ to duty ratio, D1, is $$E_o = D1(V_{s1} - V_{d1}) \quad (1)$$

$$V_{s1} = V_p \frac{(N_{s1})}{(N_p)} \quad (2)$$

where $V_{s1}$ is the secondary transformer voltage, $V_{d1}$ is the voltage drop over the output rectifier OD5 or OD6, $V_p$ is the primary voltage, $N_{s1}$ is the number of turns on the secondary, and $N_p$ is the number of turns on the primary. Substituting equation (2) into equation (1) and solving for D1 gives $$D1 = k\left(\frac{N_p}{N_{s1}}\right)\left(\frac{1}{V_p}\right), k = E_o + V_{d1} \quad (3)$$

This shows that the duty ratio is inversely proportional to the input voltage.

The following specifications relate to one possible embodiment of the present invention which has an input voltage of between 180 and 360 volts and an output of 5 volts, 130 watts. The operating frequency is 500 kHz.

The power supply consists of the following circuit components:

Transformer T-core: Machined by Ceramic Magnetics of MN8CX material

U-piece: length-30 mm, width-17 mm, thickness-6 mm

I-piece: length-30 mm, width-10 mm, thickness-6 mm gap width: 2 mils on each leg primary: 24 turns of AWG#28 secondary: 1 turn of AWG#15 output filter inductors $L_o$ uses a Micrometals T51-8C/90 core with 4 turns of AWG#24, inductance-0.5 uH The resulting transformer had a magnetizing inductance of approximately 260 microhenries and a leakage inductance of approximately 100 nanohenries. The reflected output filter inductance had a value of approximately 250 microhenries.

Filter capacitor $C_o$ is a multilayer ceramic capacitor rated 26.4 μF, 50V, AVX SM045C136KN Input: capacitor $C_i$ is a multilayer ceramic capacitor rated 1 UF, 500V, AVX SM047C105KN Blocking capacitor $C_b$ is a multilayer ceramic capacitor rated 0.5 UF, 100V, AVX SM051C504KN Switches Q1–Q4 are International Rectifier IRF840, Field Effect Transistors rated 500V, 8A Output diodes OD5 and OD6 are International Rectifier 60CNQ045 rated 45V, 60A The dc-dc converter functioned with a 90% efficiency rating because of the low-loss switching mechanisms and the choices in components. The power density of the converter was 37W/in³. This was due in part to high frequency operation at 500 kHz which allowed smaller reactive components. The design also showed the potential to be controlled in open and short circuit situations.

The circuit diagram for the control/drive of the power supply is shown in FIG. 7. The gates to the MOSFETs Q1 and Q2 are floating due to presence of an isolation transformer 121. This is necessary because two of the switches have a source tied to a floating voltage point in the power supply. The slow rise and fast fall in gate voltage allows one device to turn off before the other is gated on, thus avoiding any short circuiting of the input voltage of the power supply and ensuring substantially lossless switching. The time constant for the rise in gate-to-source voltage $V_{qs}$ is controlled by resistor 129 in the drive circuit in combination with the input capacitance of the switch being driven. In the example described above, a resistance of 120 ohms was found to provide acceptable switching losses.

In FIG. 7, a conventional pulse width modulation circuit 101 (such as a UC2825 chip from Unitrode Corporation) provides the pulses which are converted in a known manner to the phase shifted 50% duty cycle waveforms which are used in the present embodiment. The width of the output pulses from modulation circuit 101 is controlled by potentiometer circuit 102. Bypass capacitors 103 and 104 are used to filter ac noise and may be approximately 1 microfarad. Capacitor 105 may be approximately 100 picofarads. Resistor 106 may be approximately 15,000 ohms. Capacitor 105 and resistor 106 control switching frequency. The 5 and 15 volt supplies utilized to drive the chips of FIG. 7 are not shown. It should be recognized that output voltage feedback may also be used for controlling the converter voltage in a known manner (such as recommended in the data sheet for the Unitrode UC2825 PWM integrated circuit).

Output A of modulation circuit 101 drives inverter 107 which, in turn, drives inverter 108 and the preset input of D flip-flop 109. The Q output of D flip-flop 109, along with the output of inverter 108, drives exclusive-OR gate 110.

Output B of modulation circuit 101 drives inverter 111 which, in turn, drives inverter 112 and the clear input of D flip-flop 109. The $\overline{Q}$ output of D flip-flop 109, along with the output of inverter 112, drives Exclusive-OR gate 113.

The output of Exclusive-OR gate 110 drives the pre set input of a second D flip-flop 115 through inverter 114. Similarly, the output of Exclusive-OR gate 113 drives the clear input of D flip-flop 115 through inverter 116.

The $\overline{Q}$ output of D flip-flop 109 drives the gate drive circuit 118 for Q1 and Q2 through inverter 117. Similarly, the $\overline{Q}$ output of D flip-flop 115 drives a gate drive circuit (not shown) similar to 118 for Q3 and Q4.

The input to gate drive circuit 118 consists of an opposing pair of MOSFETS 119 and 120. MOSFET 119 is an International Rectifier IRF520 n-channel MOSFET, which turns on when the input to gate drive circuit 118 is positive, connecting isolation transformer to the 15 volt power supply (not shown) through blocking capacitor 122 which may be approximately 0.2 microfarads. MOSFET 120 is an International Rectifier IRF9530 p-channel MOSFET which turns on when the input to gate drive circuit 118 is low, connecting isolation transformer 121 to ground through blocking capacitor 122.

Primary 123 and secondaries 124 and 125 are arranged such that a positive voltage across primary 123 results in positive gate drive to the gate of transistor Q1 while a negative voltage across primary 123 results in a positive gate drive to the gate of transistor Q2.

The output of secondary 124 drives the gate of transistor Q1 through gate input circuit 126. Capacitor 127 isolates the transformer from the gate and may be 0.1 microfarad. Resistor 129 is the "dead time" resistor which is in series with the gate input when the voltage is rising (i.e., during turn-on). Diode 128 shorts dead time resistor 129 out during turn-off so that the switch may be turned off quickly and cleanly to avoid shoot through. Diode 128 may be a UES1102 manufactured by Unitrode.

Zener diode pair 130 and 131 clip the drive waveform to the switch to ensure that the gate voltage rating is not exceeded. Zener diode 130 may be a 1N4746A and Zener diode 131 may be 1N4733A manufactured by Motorola.

Finally, resistor 132 prevents the accumulation of static charge which could rupture the gate oxide. Resistor 132 may be a 1000 ohm resistor.

In this embodiment, dead time resistor 129 has been selected to be approximately 120 ohms. The output of secondary 125 drives circuit 135 which is identical in structure and operation to circuit 126.

The following analysis may be used to calculate the dead time resistance necessary to ensure substantially lossless switching. Knowing the gate input capacitance and the time necessary to discharge the parasitic output capacitance, an approximate value of dead time resistance 129 may be conveniently estimated from the equation $$t = RC_i \text{ or } R = \frac{C_i}{t}$$

where t is the time required to discharge the output parasitic capacitances and $C_i$ is the input capacitance of the device being turned on.

The time t required to discharge the parallel output capacitance at nominal load may be calculated separately for each of the converter legs. As explained previously, the converter legs discharge into different inductances which means that the dead time required may be different for each leg. As was also explained previously, transistors Q1 and Q2 turn on when the transformer windings are partially shorted (i.e., the voltage across the transformer windings is substantially zero). Therefore, the inductance which parasitic output capacitors PC1 and PC2 see during discharge is substantially equal to the leakage inductance $L_1$. Since inductance $L_1$ is small, the discharge time t is approximately one quarter to one half of the resonant period for the L-C combination where L is inductance $L_1$ and C is the sum of capacitances PC1 and PC2. Selecting ⅜ of the resonant period for demonstration purposes, t may be calculated as $$t = \frac{3\pi \sqrt{L_1 C}}{4}$$

However, when transistors Q3 and Q4 turn on, the calculation for t must include the reflected $L_2$ inductances for the reasons explained previously. Since inductance $L_2$ is much larger than inductance $L_1$, $L_1$ may be ignored in this calculation. Further, the magnetizing inductance will contribute a substantial component to the current. Since inductances $L_2$ and $L_M$ will normally be large enough to maintain the current at a substantially constant level for a period significantly longer than the period required to discharge the parasitic output capacitance of the incoming switch, it may be assumed that the current is a constant equal to the nominal current I which flows in the outgoing switch prior to turn off. This assumption will normally be valid for the entire dead time. Therefore, the current discharging the parasitic capacitance of the incoming switch is $$I = C \frac{\Delta V}{\Delta t}$$

where C is here the sum of capacitances PC3 and PC4 and $\Delta V$ is the rail-to-rail dc input voltage. Solving for $\Delta t$ $$\Delta t = \frac{C \Delta V}{I}$$

where I is substantially equal to the nominal current flowing in the outgoing switch prior to turn-off and $\Delta t$ is the period required to discharge the parasitic capacitance or t.

Although it may be difficult to directly measure the voltage across the parasitic output capacitance, it is possible to determine whether the objective of substantially lossless switching has been achieved by measuring the magnitude and frequency of any ringing on the transformer input. Ringing is a term of art used to described the oscillations present on switching waveforms immediately after a transition. Substantial ringing in the input to the transformer at a frequency equal to the resonant frequency of the parasitic output capacitance and the switching inductance would, therefore, indicate that the parasitic output capacitor of the incoming switch is not being completely discharged before the incoming switch is turned completely on.

The Full-Bridge Lossless Switching Converter of the present invention has several advantages for high frequency, high density power conversion. The energy stored in FET output capacitances is not dissipated, but rather is returned to the dc source resulting in low switching losses. The switching devices may be FET's which will only withstand relatively low voltage and current stresses making them more amenable to integration. The converter of the present invention may operate in the 0.5 to 10 MHz range at efficiencies of up to 85% or more. Voltage control is achieved by simply phase shifting the converter half-bridge legs relative to one another, thus enabling the converter to operate at a single frequency from full to no load. Finally, a minimum number of passive components is used, enhancing the degree of size reduction attainable through integration of the converter.

While preferred embodiments of the present invention have been shown and described herein, it will be obvious to those skilled in the art that such embodiments are provided by way of example only. Numerous variations, changes, and substitutions will now occur to those skilled in the art without departing from the invention. Accordingly, it is intended that the invention be limited only by the spirit and scope of the appended claims.

What is claimed is:

1. An improved dc-to-dc converter including a transformer with primary and secondary windings wherein said transformer includes parasitic inductances such as leakage and magnetizing inductances, said converter comprising:

an inverter having two pairs of controllable switching devices adapted to be connected in parallel across a dc supply, each of said controllable switching devices including a parasitic diode portion in inverse parallel therewith, each of said controllable switching devices further including a parasitic capacitance in parallel therewith;

a first junction between a first pair of said controllable switching devices;

a second junction between a second pair of said controllable switching devices;

the primary of said transformer being connected between said first and second junctions;

said transformer including a secondary inductively coupled to said primary, said secondary output connected to a rectifying circuit supplying a controllable voltage to a load; and control means adapted to turn said first pair and said second pair of said controllable switching devices on and off at times which result in a substantially lossless transfer of energy between said parasitic inductances and said parasitic capacitances.

2. An improved converter as in claim 1 wherein each of said controllable switching devices comprises a field effect transistor.

3. The converter according to claim 1, wherein said control means comprises:

a first switch means coupled to each of said controllable switching devices for turning on the corresponding switching device;

a second switch means coupled to each of said controllable switching devices for turning off the corresponding switching device; and a voltage sensing means coupled to each of said controllable switching devices, each said voltage sensing means being adapted to sense voltage across the corresponding switching device and turn the corresponding switching device on at times which ensure substantially lossless switching.

4. The converter of claim 3 wherein each said voltage sensing means is adapted to turn the corresponding switching device on when the voltage across the corresponding switching device is approximately zero.

5. The converter of claim 3 wherein each said first switch means includes means for disabling the operation of the respective second switch means.

6. The converter of claim 5 wherein each said second switch means includes means for disabling the operation of the respective first switch means.

7. A method of controlling the converter of claim 1 wherein said controllable switching devices comprise first, second, third and fourth switching devices, said first and second switching devices comprise said first pair of controllable switching devices, and said third and fourth switching devices comprise said second pair of controllable switching devices, the steps of said method comprising:

driving said first and fourth switching devices for a first predetermined interval sufficient to ensure that energy stored in said parasitic inductances is sufficient to provide lossless switching;

turning said first switching device off at the end of said first predetermined interval and driving said fourth switching device for a second predetermined interval sufficient to ensure a desired value of output voltage;

turning said second switching device on when current from said parasitic inductances reduces voltage across said second switching device to substantially zero volts;

turning said fourth switching device off at the end of said second predetermined interval;

turning said third switching device on when the current from said parasitic inductances reduces voltage across said third switching device to substantially zero volts;

driving said second and third switching devices for a third predetermined interval equal to said first predetermined interval;

turning said second switching device off at the end of said third predetermined interval and driving said third switching device for a fourth predetermined interval equal to said second predetermined interval;

turning said first switching device on when the current from said parasitic inductances reduces voltage across said first switching device to substantially zero volts;

turning said third switching device off at the end of said fourth predetermined interval;

turning said fourth switching device on when the current from said parasitic inductances reduces voltage across said fourth switching device to substantially zero volts; and repeating said steps of said method continuously.

8. An improved converter as in claim 1 wherein said control means includes a plurality of gate circuits, each said gate circuit being adapted to control rise time of the turn-on and turn-off signals to the corresponding controllable switching device.

9. An improved converter as in claim 8 wherein each said gate circuit comprises a resistor in series with the gate thereof, the resistance of each said resistor being sufficient to ensure that the parasitic capacitance of the corresponding switching device is substantially discharged prior to the corresponding switching device turning on.

10. An improved converter as in claim 9 wherein each said gate circuit comprises a diode in parallel with the corresponding resistor.

11. An improved converter as in claim 10 wherein each said diode includes an anode and a cathode each said anode being coupled to the corresponding controllable switching device such that the corresponding resistor influences only the rise time of the respective turn-on signal.

12. An improved converter as in claim 1 wherein each said control means includes a plurality of drive circuits, each said drive circuit being adapted to control rise time of the turn-on signal to the corresponding controllable switching device.

13. An improved converter as in claim 12 wherein each said drive circuit comprises a resistor in parallel with a diode; each said diode including an anode and a cathode and having its anode coupled to the corresponding controllable switching device, the resistance of each said resistor being sufficient to ensure that the parasitic capacitance of the corresponding switching device is substantially discharged prior to the corresponding switching device turning on.

* * * * *